United States Patent Office 3,393,176
Patented July 16, 1968

3,393,176
PROCESS FOR THE CYCLIZATION OF POLYISOPRENE
Christiaan Vervloet, Delft, Netherlands, assignor to Shell Oil Company, New York, N.Y., a corporation of Delaware
No Drawing. Filed May 17, 1965, Ser. No. 456,567
Claims priority, application Netherlands, May 22, 1964, 6405712
5 Claims. (Cl. 260—41.5)

ABSTRACT OF THE DISCLOSURE

A process for cyclizing a lithium polyisoprene having a cis 1,4-content of at least 90%, comprising heating the material in the presence of an acid cyclization catalyst selected from aryl sulfonic acids, aryl halides and amphoteric metal halides and a finely divided particulate solid dispersant and neutralizing the material while it is still in a heated condition.

---

The invention relates to a process for the cyclization of certain polyisoprenes by dry-mixing with particular acid cyclization catalysts and solid dispersants.

The cyclization of natural rubber results in a product having the same carbon-hydrogen ratio as the starting product, but in which the unsaturation has decreased owing to cyclization. Known cyclization catalysts are Lewis acids or Friedel-Crafts catalysts, such as stannic chloride, aluminium trichloride and boron trifluoride. In the earliest techniques, natural rubber was cyclized in solution. Later, a process was developed in which rubber latex was used as starting material.

These processes were conducted as "wet processes" and had the disadvantage of necessitating the subsequent removal of solvent or water in order to obtain the dry cyclizate. In view of the large amounts of cyclization catalyst which appear to be required with this type of cyclization reaction, the removal of the catalyst is a cumbersome extra operation as well.

A "dry type" of cyclization process then was developed for natural rubber, in which the rubber was simply dry-mixed with an acid cyclization catalyst and a dispersant, and heated until the desired cyclization had been obtained. The dispersants used were silicas, and in particular the anhydrous types having an active surface area. In order to obtain a partially or completely cyclized product, between 5 and 10 parts of cyclization catalyst per 100 parts of natural rubber to be cyclized and the same amount of dispersant appear to be required. If smaller amounts are used, substantially no cyclization is obtained in a technically applicable process.

In the cyclization of natural rubber a brown to black product is obtained, which may be used in the paint and lacquer industry, since a solution or an emulsion of the cyclized rubber yields a hard firm layer after evaporation of the solvent and of the water, if any. The product may also be used as an adhesive and as an additive for printing inks. The addition to natural rubber of cyclized natural rubber also appears to improve modulus of vulcanizates.

Natural rubber may be regarded as cis 1,4-polyisoprene having a cis 1,4-content of almost 100% and containing in addition proteins, sugars, and certain resins. In recent years, synthetic rubbers have become available consisting substantially of stereospecific polymers of isoprene with a very high cis 1,4-content, viz of more than 90%. In principal, two methods have been developed for the preparation of this product, both of which start from a solution polymerization of isoprene, in which the conventional solvent used is a hydrocarbon which is liquid under the reaction conditions. These methods differ with respect to the catalyst system used. In one method, use is made of a so-called Ziegler catalyst consisting of titanium tetrachloride and an aluminium alkyl compound; in this case a cis 1,4-polyisoprene is obtained which for the sake of brevity will be referred to hereinafter as Ziegler-polyisoprene. In the other method the starting material used is a lithium-based catalyst, viz metallic lithium or (preferably) an organo lithium compound, such as an alkyl lithium compound or an aryl lithium compound; for brevity's sake the resulting cis 1,4-polyisoprene will be referred to hereinafter as Li-polyisoprene. In both cases a cis 1,4-polyisoprene is obtained having a cis 1,4-content of more than 90%; however, the cis 1,4-content of the Ziegler-polyisoprene appears to be slightly higher than that of the Li-polyisoprene.

Now, in accordance with the invention, it has been found that only the Li-polyisoprene lends itself to a cyclization with the aid of a special variety of the dry process described above. Remarkably enough, it has proved impossible to cyclize the Ziegler-polyisoprene by using the dry method known for natural rubber, although with respect to the cis 1,4-content this analogue is a closer approximation to natural rubber than Li-polyisoprene. It has also been found that the quantities of acid cyclization catalyst required for the cyclization of Li-polyisoprene are much smaller than the quantities used for natural rubber. Whereas the cyclization of natural rubber requires quantities of between 5 and 10 parts catalyst per 100 parts of rubber, in the case of the Li-polyisoprene for all practical purposes a quantity of 0.1–3 parts catalyst per 100 parts polyisoprene is sufficient for cyclization. In most cases, complete cyclization is even possible with one part of catalyst per 100 parts of rubber to be cyclized.

The invention therefore relates to a process for the cyclization of a rubber by dry-mixing the rubber with an acid cyclization catalyst and a solid dispersant, using as rubber a cis 1,4-polyisoprene obtained by solution polymerization of isoprene with the aid of a lithium-based catalyst, in the presence of not more than 3 parts of the acid cyclization catalyst per 100 parts of polyisoprene.

The cyclization catalysts found to be most effective include aryl sulfonic acids such as para-toluene sulfonic acid; amphoteric metal halides such as aluminium chloride, tin chloride or titanium chloride. Also a mixture of benzyl-chloride and zinc oxide or zinc chloride has proved to be a suitable cyclization catalyst.

Quantities of 1.0–1.5 parts of acid cyclization catalyst per 100 parts of rubber will generally be sufficient to obtain complete cyclization. If smaller quantities are used, there will be partial cyclization.

Compounding the rubber with the acid cyclization catalyst may be accomplished by means of any suitable rubber mixer, for example, a Banbury mill. A solid dispersant (0.1–3 phr.) should be incorporated as well. It has been found that in addition to the anhydrous type of silica having active surface areas, hydrated forms, such as dried silica gel, may be used. Carbon blacks, such as HAF-black or EPC-black, may also be employed. For the solid dispersant too, quantities in the order of magnitude of 0.3–1.5 parts per 100 parts of Li-polyisoprene to be cyclized will generally be sufficient.

Before compounding, the empty Banbury is heated to an initial temperature of at least 100° C., usually 120–130° C. After charging the Banbury cyclization commences at temperatures around 150° C. and (since more frictional heat is developed, caused by the stiffening of the cyclizing polymer while the reaction is also exothermic) a temperature of 180–250° C. is reached within 1–30 minutes. Subsequently, constant or slowly decreasing temperature indicates the termination of the reaction.

In general heating for periods of 1 to 30 minutes at temperatures of 100 to 225° C. or, preferably, for 3 to 15 minutes at temperatures of from 110 to 200° C., are suitable.

Before neutralization the cyclized product is dark red; after neutralization with an alkaline compound, e.g. a metal oxide the color changes, however, to yellow-white. Thus, by means of the present process it is possible to prepare a cyclized rubber which, unlike the brown-to-black colored product obtained in the known cyclization of natural rubber, is of a very light color. It will be readily appreciated that this is a great advantage in the applications already referred to above, particularly in applications in the paint and lacquer industry.

Without neutralization, the cyclization reaction appears to pass into a cross-linking reaction, in which a gelled product is ultimately formed. This gel is insoluble in solvents for the cyclizate. After immediate neutralization, however, the cyclization product obtained by the present process appears to have a low gel content. This gel content may be still further reduced by employing a special neutralization within the scope of the present invention. The conventional neutralization agent used in the known cyclization techniques is magnesium oxide. It has been found, however, that if zinc oxide is used as neutralization agent, a substantial reduction of the amount of gel in the cyclization product may be achieved. Moreover, zinc oxide is considerably cheaper than magnesium oxide.

Within the scope of the present invention it has also been found that by using organic amines the gel content of the resulting cyclization product may be still further reduced and even completely suppressed. It has, in fact, been found that in using these neutralization agents, cyclization products are obtained which may be processed instantly, i.e., without previous removal of a possible gel fraction, to form a clear and gel-free solution in benzene, as will be illustrated in the examples. In general 0.5–5 parts of the oxide or organic amine per 100 parts of cyclization product should be added, a greater amount naturally being required of the higher than of the lower molecular amines.

Another great advantage of using organic amines as neutralization agent is that the reaction product is readily removed from the cyclization apparatus. When using, for example, a Banbury mixer it was found that in most cases the reaction product drops out immediately after opening the Banbury. The amines, therefore, appear to eliminate the adhesion to steel; when using zinc oxide and also when using magnesium oxide as neutralization agent as already known for the cyclization of natural rubber, the cyclization product adheres to the steel of the Banbury at elevated temperature. In fact, to remove the reaction product in the latter case, the Banbury has to be completely cooled, after which the resin is slowly cracked by carefully setting the rotors of the Banbury in motion.

It is preferred to use primary and secondary amines. In general the amine should be added as soon as the cyclization reaction is terminated, i.e., when the reaction mixture still has a temperature of 180–200° C., since if the mixture is allowed to cool too long before neutralization, gel quickly starts to form in the cyclized product. Hence, the reaction mixture is preferably neutralized when its temperature is still above 180° C. and for this reason the amine used should not be too volatile at this temperature. Amines having a relatively high molecular weight, such as primary and secondary dodecylamine and primary octadecylamine have proved to be very suitable. An amine, such as dibutylamine, with a boiling point of 160° C. can admittedly be used, but part of it evaporates owing to the high temperature unless used under pressure.

The decomposition of the polymer during the cyclization may be prevented by adding at least 1–5 parts of a rubber antioxidant per 100 parts of rubber to the mixture to be cyclized. It has been found that a combination of the two antioxidants 2,6-di(tert-butyl)-4-methyl phenol and tris-(p-nonyl phenyl) phosphite is particularly suitable. While excluding gel-formation, the use of this combination of antioxidants results in a cyclizate having a relatively high intrinsic viscosity and a low gel-content as will be illustrated by the examples.

It has also been found that reproducibly partially cyclized products may be prepared by the process according to the invention. In the known cyclization of natural rubber it has, in fact, not proved to be very feasible to reproducibly adjust the degree of cyclization to a desired level by using a certain quantity of catalyst and a certain temperature. This is attributable, among other things, to the varying composition (varying protein content) of natural rubber. In the present process, however, the desired degree of cyclization may be reproducibly controlled simply by suitable adjustment of catalyst and temperature level and this permits the large-scale preparation of cyclizates with a degree of cyclization varying between narrow limits. As the degree of cyclization increases, the partially cyclized products appear to vary from soft rubbers, via tough and leathery products to brittle resins upon complete cyclization.

The resulting cyclization product lends itself admirably to applications known for cyclorubbers, the above mentioned light color of the product according to the invention being of particular advantage. Applications include the use in coatings and paints, in printing ink and adhesives. Within the scope of the invention, it has also been found that the cyclorubber is particularly well adapted to formulating polymer compositions. If the cyclized rubber is compounded with a polymer of an alpha-olefin, in particular with polypropylene, this improves the possibility of dispersing a pigment in the dry state ("dry coloring"); at the same time the dyeability of such mixtures appears to be improved.

Films prepared from a completely cyclized Li-polyisoprene according to the invention appear to have a permeability to air which ranges from very low to zero. In this case also the light color of the present cyclorubber is of particular advantage since the resulting film is hardly, if at all, colored. It will be understood that the light color is also of advantage when the product is used in laminates or in coatings and in polymer compositions.

A very important application of the present cyclorubbers is their use as additives to solution Li-polyisoprene to improve the lack of green strength of the polyisoprene. Lack of green strength is demonstrated among other things by a lower degree of cohesive strength on the rubber mill. Strips or sheets of the unvalcanized materials show a tendency to tear and flow by their own weight if no special precautions for transport are taken. This constitutes a drawback in the commercial use of these synthetic rubbers. It has been found that the green strength may be considerably improved by adding cyclized Li-polyisoprene prepared according to the invention. With as little as 12.5% by weight of completely cyclized Li-polyisoprene, based on synthetic rubber plus cyclorubber, a pronounced improvement of the strength properties of the mixture in the unvulcanized state was established. In general, quantities of completely cyclized cyclorubber of between 10 and 30% by weight, based on the total quantity of synthetic rubber and cyclorubber present in the mixture, are used. In the case of partially cyclized rubbers greater quantities may be employed; thus in the case of 50–60% cyclized rubbers, quantities of up to 50% by weight, based on synthetic rubber plus cyclorubber have proved to be suitable.

Compositions of Li-polyisoprene and cyclized Li-polyisoprene are particularly well adapted to the preparation of rubber articles by means of injection molding. Of the known synthetic rubbers, Li-polyisoprene is the most suitable starting material in injection molding because of its exceptionally good flow properties. Owing to the presence of the cyclorubber, the green strength is greatly increased, which facilitates the compounding of injection molding mixtures by mixing therewith rubber chemicals such as fillers, pigments and vulcanizing agents. The favorable flow properties are retained almost unchanged so that the injection times are not essentially increased. Upon removal of the vulcanizate from the molding at conventional temperatures (80–100° C.) there is also found to be less tearing, from which it follows that by admixing cyclized Li-polyisoprene the tear resistance at these temperatures is increased.

In those rubber compositions having tacky vulcanizate properties at the usual vulcanization temperatures (160–180° C.), such as compositions containing large amounts of microtalc or carbonates or compositions without fillers for transparent vulcanizates, the tack is greatly reduced and even completely eliminated by using cyclized Li-polyisoprene, as a result of which adhesion to the mold is avoided.

The invention will be illustrated with reference to the following examples.

Example I

A Banbury mill, type B, comprising a chamber with a capacity of 1.69 liters corresponding to a loading capacity of about 1 kg. of polymer and provided with two Z-shaped rotors, and in which a pressure of 3 atm. gauge can be exerted by means of a plunger, was charged with a controlled amount of the polyisoprene composition to be examined after setting an initial temperature of 125° C. After closing the Banbury, the mixture was kneaded, which operation was followed by a sharp rise in temperature and after about 4 minutes a final temperature of 180–200° C. was reached. After this temperature had been reached, the chamber was immediately opened and a controlled amount of neutralization agent was added; after closing the chamber, mixing was continued for a minute. The bottom gate was subsequently opened and the product discharged, if necessary after previous cooling.

The following compositions were examined:

The intrinsic viscosities (I.V.) are measured in toluene at 25° C. and expressed in dl./g.

(A)

| | Parts by weight |
|---|---|
| Li-polyisoprene (I.V. 7) | 100 |
| p-Toluene sulfonic acid monohydrate | 1 |
| Anhydrous silica powder; average particle size 200 A. | 1 |
| Magnesium oxide, powdered, as neutralizing agent | 1 |

A completely cyclized product was obtained, which was very pale yellow in color, from which by ultracentrifuging at 20,000 g. for 30 minutes a 10% by weight solution in benzene, and after drying to constant weight, 10–15% by weight of gel based on the polymer was isolated. The intrinsic viscosity of the cyclizate was 0.35 dl./g. The cyclizate is readily soluble in hydrocarbons. The second-order transition temperature or glass-transition temperature Tg is about 95° C., determined by measuring the minimum of the rebound resilience (Lupke impact resilience). The clear solution in benzene obtained after ultracentrifuging appeared to form a gelatinous mass upon standing at room temperature for six months.

(B)

| | Parts by weight |
|---|---|
| Ziegler polyisoprene | 100 |
| p-Toluene sulfonic acid monohydrate | 10 |
| Anhydrous silica powder | 10 |

Notwithstanding the large amounts of cyclization catalyst and dispersant there appeared to be no cyclization. This was confirmed by infrared analysis.

(C)

| | Parts by weight |
|---|---|
| Ziegler polyisoprene | 100 |
| Aluminium trichloride·6H₂O | 10 |
| Anhydrous silica powder | 10 |

In this case, also, there appeared to be no cyclization at all.

In the tests D–F, the neutralization agent used was MgO.

(D)

| | Parts by weight |
|---|---|
| Li-polyisoprene | 100 |
| AlCl$_3$·6H$_2$O | 3 |
| Anhydrous silica powder | 1 |

In this case complete cyclization was obtained. Complete cyclization was also obtained with 3 parts by weight of SnCl$_4$·4H$_2$O or with 3 parts by weight of TiCl$_4$.

(E)

| | Parts by weight |
|---|---|
| Li-polyisoprene | 100 |
| Benzyl chloride | 0.5 |
| Zinc chloride | 0.5 |
| Anhydrous silica powder | 1 |

In this case complete cyclization and a substantially uncolored product were obtained.

(F)

| | Parts by weight |
|---|---|
| Li-polyisoprene | 100 |
| p-Toluene sulfonic acid monohydrate | 1 |
| Dried hydrated silica powder | 1 |

Again complete cyclization was obtain. Under otherwise identical conditions complete cyclization was also obtained with 1 part by weight of HAF-black or 1 part by weight of EPC-black.

Optimum results are usually obtained, when using 0.5 to 1.5 parts by weight of the particulate dispersant per 100 parts by weight of rubber. Absence of dispersant results in non-homogeneous cyclization and requires longer reaction times.

(G)

| | Parts by weight |
|---|---|
| Li-polyisoprene | 100 |
| p-Toluene sulfonic acid monohydrate | 1 |
| Anhydrous silica powder | 1 |
| Transparent zinc oxide as neutralization agent | 1 |

In this case a substantially uncolored cyclization product was obtained (I.V. 0.35) from which only 4–5% by weight of gel (based on cyclizate) was isolated by ultracentrifuging (20,000 g.; 30 min.) a 10% by weight solution in benzene and drying the isolated gel to constant weight. When keeping the ultracentrifuged solution at room temperature for 6 months there appeared to be no after-gelling.

(H)

Operating conditions were identical to those under G, except that before cyclization a further 3 parts of 2,6-di-(tert-butyl)-4-methyl phenol antioxidant per 100 parts of Li-polyisoprene were incorporated. An uncolored cyclizate was obtained having a gel-content (as determined under G) of less than 2% by weight. The intrinsic viscosity of the cyclizate was 0.60 dl./g.

(J)

Operating conditions were identical to those of test H, except that in addition to 3 parts of the same phenol were used as antioxidant 3 parts of tris-(p-nonyl phenyl)phosphite per 100 parts of Li-polyisoprene. Again a substantially uncolored cyclizate was obtained. After simply filtering off over a metal filter gauge (200 mesh), a 10% by weight solution in benzene could be freed from impurities (less than ½% by weight based on cyclizate and consisting of ZnO and gel). The intrinsic viscosity was 0.66 dl./g.

(K)

Under the conditions of test J, a cyclization was carried out but in this case the neutralization agent used was an organic amine instead of zinc oxide.

In five tests the cyclization product was neutralized with 3 parts by weight of stearylamine, 2 parts by weight of laurylamine, 2 parts by weight of dibenzylamine, 2 parts by weight of dicyclohexylamine and 2 parts by weight of dibutylamine respectively per 100 parts by weight of Li-polyisoprene. The discharge at high temperature from the Banbury is greatly facilitated by the presence of the amines. The resulting uncolored cyclizates were gel-free, as was found by ultracentrifuging a 10% by weight solution of benzene. It is true that some amines, such as stearylamine, which are less soluble in benzene, appear to crystallize in the benzene solution, but in the case of dibutylamine and cyclohexylamine no depoits were observed, even after prolonged storage. The intrinsic viscosity of the resulting cyclizates varied from 0.7 to 1.1 dl./g.

(L)

Under the conditions of test K, 0.5 part by weight instead of 1 part by weight of p-toluene sulfonic acid monohydrate was used per 100 parts by weight of Li-polyisoprene to achieve partial cyclization. A tough, elastic product (I.V. 1.6) was obtained which had a degree of cyclization of about 50% and a second order transition temperature Tg of 23° C.

This product in the undermentioned pure gum compound exhibits extreme elongation properties at room temperature (3,000% elongation at break) and a yield value of 6 kg./cm.$^2$. The following mixture was composed and vulcanized:

| | Parts by weight |
|---|---|
| Cyclorubber | 100 |
| Zinc oxide | 5 |
| Stearic acid | 3 |
| Antioxidant | 1 |
| Benzothiazyldisulfide | 0.4 |
| Diphenylguanidine | 0.2 |
| Sulfur | 2.5 |

The elongation at break of the vulcanizate was 620%, the tensile strength 120 kg./cm.$^2$ and the second order transition temperature was likewise 23° C.

The cyclization reactions may also be carried out using Li-polyisoprene extended with oil (for example with 20% oil). At similar reaction conditions, the degree of cyclization is not affected by the presence of extending oil. However, the presence of oil reduces the glass transition temperature, especially of partially cyclized products.

Example II

This example illustrates the advantages gained by using the cyclorubber as component in a polypropylene composition.

(A)

A mixture of partially cyclized Li-polyisoprene prepared as described in Example I (L), with a number of rubber pigments was prepared by compounding on a heated mill at 70° C., using 10 parts by weight of pigment per 100 parts by weight of cyclorubber. After a few minutes a homogeneous mixture was obtained. Polypropylene was also plasticized on a mill, after which 1 part by weight of the cyclorubber/pigment mixture per 100 parts by weight of plasticized polypropylene was added and compounded therewith. The resulting mixture was worked up to form a film. The pigment in the film was found to have been incorporated completely homogeneously. The same result may be obtained by using a completely cyclized Li-polyisoprene. Such a homogeneous compounding cannot be realized if the pigment is added as such to the polypropylene.

(B)

In a compounding test as under A, but omitting the pigment, an uncolored polypropylene composition was obtained, the dyeability of which was found to be greatly improved. The air permeability of films or coatings which may be prepared from such mixtures appears to be strongly diminished by the presence of the cyclorubber. As the cyclorubber contains no gel particles, the resulting films are free from cloudiness. In this case also a completely cyclized Li-polyisoprene may be used.

Example III

This example illustrates the use of cyclorubber as an adhesive.

The product obtained according to Example I (K), containing as neutralization agent 2 parts by weight of dibutylamine was dissolved in benzene (35% by weight of cyclizate in solution). This solution was used without further addition as an adhesive for rubber soling mixtures, which after application of the solution and drying were press-cured direct to the vamp at the usual temperature of about 170° C. The soling rubber contained 70 parts by weight of Li-polyisoprene (extended with 20% by weight of oil), 15 parts by weight of high-styrene resin (SBR with 85% styrene), 45 parts by weight of a pigment and carbon black. The adhesive strength of the sole to the vamp was particularly great, as appeared from a test in which the shoe was subjected to severe flexing, the front of the sole being simultaneously tested for stripping off. The standard given in this test is a minimum resistance to stripping of 25 kg. In this case a duplicate determination showed a resistance to stripping of 38.5 kg. and 39.5 kg. Only the more expensive adhesive compositions consisting of various polymers show comparable results.

Example IV

By compounding a cyclorubber prepared according to the invention with a Li-polyisoprene a remarkable improvement in the green strength was obtained and consequently an improvement in handling and transportability. During admixture, the cyclizate is preferably first preheated to above the glass transition temperature. As a result it can be smoothly applied to a mixing mill at a temperature of 90–100° C., after which it may be compounded with unplasticized Li-polyisoprene. Thus, by compounding 12.5% by weight of cyclized Li-polyisoprene prepared according to Example I (J), with Li-polyisoprene a mixture was obtained.

| | Mixture of cyclorubber +IR[1] | IR[1] |
|---|---|---|
| Yield value (kg./cm.$^2$) | 4 | 1.5 |
| Elongation at break (percent) | 300 | 100 |

[1] IR=Li-polyisoprene.

The properties of the vulcanizate obtained from the mixture are found not to be adversely affected by the presence of the cyclorubber.

I claim as my invention:
1. A rubber cyclization process which comprises:
   (1) dry-mixing
      (a) 100 parts by weight of a polyisoprene having a cis 1,4 content of at least 90% obtained by solution polymerization with a lithium-based catalyst;
      (b) 0.1–3 parts by weight of an acid cyclization catalyst of the group consisting of aryl sulfonic acids, aryl halides, and amphoteric metal halides; and
      (c) 0.1–3 parts by weight of a finely divided particulate solid dispersant of the group consisting of silicas and carbon blacks;
   (2) heating the mixture free from solvent therefor at temperatures within the range of 100–225° C. for 1–30 minutes;
   (3) and substantially immediately admixing therewith 0.5–5 parts by weight of an alkaline compound of the group consisting of amphoteric metal oxides selected from zinc and magnesium oxides and relatively nonvolatile amines.
2. A rubber cyclization process which comprises:
   (1) dry-mixing

(a) 100 parts by weight of a polyisoprene having a cis 1,4 content of at least 90% obtained by solution polymerization with a lithium alkyl catalyst;
(b) 0.3–1.5 parts by weight of an acid cyclization catalyst of the group consisting of aryl sulfonic acids, aryl halides, and amphoteric metal halides; and
(c) 0.5–1.5 parts by weight of a powdered silica;
(2) heating the mixture free from solvents therefor at 110–200° C. for 3–15 minutes;
(3) and substantially immediately admixing therewith 1–2.5 parts by weight of zinc oxide.

3. A rubber cyclization process according to claim 1 wherein the step (2) is carried out in the presence of 1–5 parts by weight of rubber antioxidant.

4. A process according to claim 2 wherein the catalyst is paratoluene sulfonic acid.

5. A composition comprising the components:
(a) a cis 1,4-polyisoprene obtained by solution polymerization with a lithium alkyl catalyst; and
(b) 10–30% by weight based on (a)+(b) of a cyclized polyisoprene produced by the process of claim 1.

References Cited

FOREIGN PATENTS 483,815   6/1952   Canada.

OTHER REFERENCES

Morita et al.: J.A.C.S., vol. 79, Nov. 20, 1957, pp. 5853–5855.

C and EN, Oct. 15, 1962, pp. 44–46 and 48.

ALLAN LIEBERMAN, *Primary Examiner.*